(12) United States Patent
Hjertberg et al.

(10) Patent No.: US 9,109,064 B2
(45) Date of Patent: Aug. 18, 2015

(54) ETHYLENE POLYMERIZATION PROCESS USING AN INHIBITOR

(71) Applicant: BOREALIS AG, Vienna (AT)

(72) Inventors: Thomas Hjertberg, Kungshamn (SE); Torbjorn Magnusson, Stenungsund (SE); Bjorn Voigt, Hisings Backa (SE); Mattias Bergqvist, Gothenburg (SE); Kenneth Johansson, Stenungsund (SE); Marcus Kierkegaard, Molndal (SE); Annika Smedberg, Myggenas (SE)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 14/379,232

(22) PCT Filed: Mar. 12, 2013

(86) PCT No.: PCT/EP2013/000725
§ 371 (c)(1),
(2) Date: Aug. 15, 2014

(87) PCT Pub. No.: WO2013/149698
PCT Pub. Date: Oct. 10, 2013

(65) Prior Publication Data
US 2015/0031843 A1    Jan. 29, 2015

(30) Foreign Application Priority Data

Apr. 2, 2012    (EP) .................................. 12002398

(51) Int. Cl.
| C08F 2/00 | (2006.01) |
| C08F 36/00 | (2006.01) |
| C08F 210/00 | (2006.01) |
| C08F 210/02 | (2006.01) |

(52) U.S. Cl.
CPC .................. C08F 210/02 (2013.01)

(58) Field of Classification Search
CPC .... C08F 210/02; C08F 210/18; C08F 218/08; C08F 2500/12; C08F 236/20; C08F 2/40
USPC ........................................... 526/64, 335, 348
See application file for complete search history.

(56) References Cited

U.S. PATENT DOCUMENTS

| 3,377,324 A | | 4/1968 | Mostert et al. | |
| 5,539,075 A | * | 7/1996 | Gustafsson et al. | .......... 526/339 |
| 6,262,323 B1 | | 7/2001 | Elder | |
| 6,525,146 B1 | | 2/2003 | Shahid | |
| 2010/0305327 A1 | * | 12/2010 | Negishi et al. | ................. 546/188 |

FOREIGN PATENT DOCUMENTS

| CN | 101823932 A | 9/2010 |
| JP | S52119693 A | 10/1977 |
| WO | 93/08222 A1 | 4/1993 |

OTHER PUBLICATIONS

International Preliminary Report on Patentability of International Application No. PCT/EP2013/00000725 mailed Oct. 7, 2014.
Buback, M et al., Chemie Ingenieur Technik, 66 No. 4, (1994) pp. 510-513.
Buback, M et al., Chemie Ingenieur Technik, 67 No. 12, (1995) pp. 1652-1655.
International Search Report of International Application No. PCT/EP2013/000725 dated May 21, 2013.
"Encyclopedia of Polymer Science and Engineering", vol. 6 (1986), pp. 383-410.

* cited by examiner

*Primary Examiner* — William Cheung
(74) *Attorney, Agent, or Firm* — Roberts Mlotkowski Safran & Cole, P.C.

(57) ABSTRACT

The present invention relates to an ethylene homo- or copolymerization process, characterized in that an inhibitor is added to the reaction mixture or any of its components before the reaction mixture is fed to the reaction zone. The present invention further relates to the use of an inhibitor to reduce fouling in an ethylene homo- or copolymerization process.

15 Claims, No Drawings

ETHYLENE POLYMERIZATION PROCESS USING AN INHIBITOR

This application is a 371 National Stage Application of PCT International Application No. PCT/EP2013/000725 filed Mar. 12, 2013, which claims priority to European Patent Application No. 12002398.1 filed Apr. 2, 2012, both of which are incorporated by reference herein in their entirety.

The invention relates to an ethylene polymerization process in which an inhibitor is added to the reaction mixture or any of its components before the reaction mixture is fed to the reaction zone. The present invention further relates to the use of an inhibitor to reduce fouling in an ethylene homo- or copolymerization process, especially preheater fouling.

In high pressure radical ethylene polymerization reactions ethylene monomers and, optionally, polyunsaturated comonomers are polymerized under very high pressure, which is usually above 100 MPa, and at temperatures of usually above 80° C. The radical polymerization reaction is started by the use of a radical initiator such as $O_2$ or a peroxide.

It is often necessary to heat the compressed reaction mixture in order to reach a temperature suitable for the radical initiator to decompose and, thus, start the polymerisation reaction. This is normally done by passing the reaction mixture (not yet comprising the radical initiator) through a pre-heater, e.g. heated tubes. In spite no radical initiator is present in the pre-heater, it has been observed that often polymerization occurs at the walls of the pre-heater yielding a thin polymer film covering the wall. Such a film reduces heat transfer efficiency. In the following this is denoted "pre-heater fouling". In case this fouling grows rapidly without being removed, e.g. by the process stream, the average temperature of the reaction mixture entering the reactor is decreasing. Said average temperature may even drop below the desired decomposition temperature of the radical initiator. Hence, the initiator is not able to form free radicals at the desired rate and, thus, the rate of polymerization in the reactor where the reaction mixture is fed into may be greatly reduced or the reaction may even completely stop. Passing unreacted radical initiator through the reactor is a major safety concern as the polymerisation reaction may be initiated at undesired locations within the reactor.

In case of a polyunsaturated comonomer having at least two non-conjugated double bonds usually only one of the double bonds is incorporated into the main polymer chain during polymerisation whereby the other(s) remain unaffected and, thus, increases the double-bond content of the polymer. Such an increased double-bond content improves the cross-linking properties of the polymer. It has been observed that fouling may already occur in pure ethylene feeds. However, in case the reaction mixture is containing polyunsaturated comonomers, the reaction mixture is even more prone to fouling, e.g. pre-heater fouling, compared with pure ethylene feed.

Thus, there is the need for an ethylene polymerization process wherein fouling, such as pre-heater fouling, is avoided or at least reduced.

It has been surprisingly found that the above object can be achieved by adding an inhibitor to the reaction mixture before it is fed to the reaction zone.

Therefore, the present invention provides an ethylene homo- or copolymerization process, characterized in that an inhibitor is added to the reaction mixture or any of its components before the reaction mixture is fed to the reaction zone.

In the present invention an inhibitor is a substance that decreases the rate of, or prevents, a chemical reaction, particularly an unwanted polymerization reaction, such as a premature polymerisation reaction at the preheater walls prior to addition of the radical initiator.

Preferably the process is a high pressure ethylene polymerization process in which ethylene is polymerized with a polyunsaturated olefin comprising at least 6 carbon atoms and at least two non-conjugated double bonds of which at least one is terminal.

The fouling, e.g. pre-heater fouling, is considered to be due to impurities contained in the reaction mixture originating from the used grade of the polyunsaturated olefin.

It has been surprisingly found that by adding an inhibitor prior to feeding the reaction mixture to the reaction zone undesired fouling, such as pre-heater fouling, can be avoided or at least significantly reduced. Thereby stable reaction conditions can be maintained which lead to more homogenous product properties. Furthermore, the safety is improved as the radical initiator decomposes where desired. In addition, it is not necessary to modify the process conditions during the process depending on the varying temperature of the reaction mixture prior to adding the radical initiator, e.g. the initiator feed.

Furthermore, usually in a high pressure ethylene polymerization plant more than one product with differing compositions is produced in a continuous manner. It is desirable that the switching of the production from one product to another product can be done as fast as possible, so that as little production time as possible is lost and as little as possible intermediate products, which do not meet the specification of any of the first or second product, are produced.

When switching from one product to another, the residues present in the pre-heater fouling layers may separate from the walls and contaminate the product obtained. Thus, more time is needed until the polymer obtained from the plant meets the specification of the second product. Thus, by reducing or even avoiding pre-heater fouling the switching time is reduced. The switching time is defined to be the time from when the last polymer product in accordance with the specification for the first product is obtained until the first polymer with the specification for the second product is obtained. Thus, with the process of the invention switching from one product to another is faster.

In the present invention the term "polymerisation process" denotes that two or more different monomers are co-polymerised in the process. Hence, in the polymerisation process of the present invention also three, four or more different co-monomers may be co-polymerised.

Consequently, the polyethylene produced in the process of the present invention may contain two or more different co-monomers.

Usually not more than five different co-monomers are used in the polymerisation process of the present invention, preferably not more than four different co-monomers and most preferably not more than three different co-monomers.

Polymerization of ethylene (co)polymers by free radical initiated polymerization at high pressure (referred to as high pressure radical polymerization) is since long known in the art. Generally, the polymerization is performed reacting the monomers under the action of one or more radical initiators such as peroxides, hydroperoxides, and oxygen or azo compounds, usually oxygen, peroxides, or azo compounds are used, in a reactor at a temperature of about 80 to 350° C. and at a pressure of 100 to 500 MPa.

Usually, the polymerization is carried out in either an autoclave or a tubular reactor, commonly in a continuous manner.

The autoclave process may, for example, be conducted in a stirred autoclave reactor. The stirred autoclave reactor is commonly divided into separate zones. The main flow pattern is from top zone(s) to bottom zone(s), but backmixing is allowed and sometimes desired. The stirrer is preferably designed to produce efficient mixing and flow patterns at a suitable speed of rotation selected by a person skilled in the art. The compressed mixture is commonly cooled and fed to one or more of the reactor zones. Radical initiators may also be injected at one or more zones along the reactor. As radical initiator, any compound or a mixture thereof that decomposes to radicals at an elevated temperature can be used. Usable radical initiators are commercially available, e.g. di-tert.-butyl peroxide. The polymerization reaction is exothermic and after startup (at elevated temperature, e.g. from 80 to 150° C. to create the first radicals) the exothermic heat generated sustains the reaction. Temperature in each zone is mainly controlled by the cooled incoming feed mixture, and the flow of peroxide. Suitable temperatures range from 80 to 300° C. and pressures from 100 to 300 MPa. Pressure can be measured at least in the compression stage and after the autoclave reactor. Temperature is commonly measured for each zone of the autoclave reactor.

However, the high-pressure radical ethylene polymerization reaction is preferably performed in a tubular reactor.

Generally, monomer conversion is higher in a tubular reactor than in an autoclave reactor. Furthermore, by polymerization in a tubular reactor, ethylene (co)polymers with a branching structure well suited for cross-linking thereof can be provided.

Tubular reactors are either single-feed or multi-feed reactors, including split-feed reactors. In a single-feed tubular reactor (also referred to as front-feed reactor), the total monomer flow is fed to the inlet of the first reaction zone. In a multi-feed tubular reactor, the monomers are fed into the reactor at several locations along the reactor. In a split-feed reactor, the compressed monomer mixtures are split into two streams and fed into the reactor at different locations thereof.

Tubular reactors include one or more reaction zones. Reaction is started in each zone by injection of a radical initiator. Prior to the first zone, the reaction mixture is usually passed through a pre-heater in order to reach a temperature suitable for initiation of the first zone. Upon injection of the radical initiator, a first reaction temperature peak is obtained by the exothermal polymerization. The temperature of the reaction mixture then decreases by cooling through the tube walls while the monomer and polymer reaction mixture is flowing along the first reaction zone. The next reaction zone is defined by, again, injection of a radical initiator upon which a second reaction temperature peak and a subsequent decrease in temperature of the reaction mixture along the second reaction zone is obtained. The number of initiator injection points thus determines the number of reaction zones. A tubular reactor for the production of ethylene copolymers by high pressure radical polymerization usually comprises a total of two to five reaction zones.

After the end of the last reaction zone, the temperature and pressure of the reaction mixture including the reaction product are lowered, typically in two steps using a high pressure separator and a low pressure separator. The resulting polymer product is recovered and unreacted monomers are usually recycled back to the reactor. Further details on the production of ethylene (co)polymers by high pressure radical polymerization can be found in "Encyclopedia of Polymer Science and Engineering", Vol. 6, (1986), pages 383 to 410 which is hereby incorporated by reference.

In the present invention the reaction mixture comprises ethylene, the polyunsaturated comonomer and, optionally, one or more of the further compounds described herein.

In case the polymerisation is carried out in a tubular reactor, the reaction mixture comprising ethylene and the polyunsaturated olefin comprising at least 6 carbon atoms and at least two non-conjugated double bonds of which at least one is terminal is usually preheated before entering the reaction zone. The pre-heating is normally effected by a pre-heater upstream of the reactor.

Even in case no separate pre-heater is used, i.e. no fouling in such a pre-heater can occur, the process of the present invention is also advantageous as premature polymerisation prior to feeding the radical initiator to the reaction mixture can be avoided and even after the radical initiator is fed undesired side reactions are avoided.

Preferably, the polyunsaturated olefin comprises at least 7 carbon atoms, more preferably at least 8 carbon atoms. The polyunsaturated olefin usually comprises 30 carbon atoms or less.

The polyunsaturated olefin is preferably a $C_6$- to $C_{20}$-olefin, more preferably the polyunsaturated olefin is a $C_6$-to $C_{16}$-olefin.

Non-conjugated denotes that there is at least one atom present between the atoms of two different double bonds. Preferably, at least two, more preferably at least three and most preferably at least four atoms are present between the atoms of two different double bonds. These atoms present between the carbon atoms of two different double bonds are preferably carbon atoms.

Preferably all double bonds in the polyunsaturated olefin are carbon-carbon double bonds.

The polyunsaturated olefin usually comprises not more than four non-conjugated double bonds, preferably not more than three non-conjugated double bonds and most preferably two non-conjugated double bonds, i.e. is a diene.

Furthermore, the polyunsaturated olefin preferably has a linear carbon chain.

The polyunsaturated olefin is preferably free of heteroatoms.

Preferably all double bonds in the polyunsaturated olefin are terminal double bonds.

Most preferably the polyunsaturated olefin is selected from 1,7-octadiene, 1,9-decadiene, 1,11-dodecadiene 1,13-tetradecadiene, 7-methyl-1,6-octadiene, 9-methyl-1,8-decadiene, or mixtures thereof, more preferably from 1,7-octadiene, 1,9-decadiene, 1,11-dodecadiene and 1,13-tetradecadiene.

Besides non-conjugated double bonds the polyunsaturated compound may comprise conjugated double bonds but is preferably free of conjugated double-bonds.

Further preferred embodiments of the polyunsaturated olefin are all those as described in WO 93/08222. Those compounds are included herein by reference to this document.

Particularly preferred is 1,7-octadiene.

Usually, in high pressure radical ethylene polymerization processes, a chain transfer agent is used in order to control the molecular weight of the produced polymer. Chain transfer agents may be non-polar compounds, e.g. straight chain or branched alpha-olefins with three to six carbon atoms such as propylene, or may be polar compounds being e.g. straight-chain or branched saturated compounds having a group with an heteroatom such as N, S, O, e.g. a hydroxyl, carbonyl, carboxyl, alkoxy, aldehyde, ester, nitrile or sulfide group.

Hence, the reaction mixture preferably comprises a chain transfer agent.

The chain transfer agent is preferably selected from aldehydes, ketones, alcohols, saturated hydrocarbons, alpha-olefins or mixtures thereof, more preferably the chain transfer agent is selected from propionaldehyde, methylethylketon, propylene, isopropylalcohol or mixtures thereof.

Preferably the chain transfer agent is present in the reaction mixture fed to the reaction zone in a concentration of at least 0.01 wt. %, more preferably of at least 0.1 wt. %, even more preferably of at least 0.2 wt. % based on the total weight of the reaction mixture.

The chain transfer agent preferably present in the reaction mixture fed to the reaction zone in a concentration of 10 wt. % or less, more preferably of 7 wt. % or less and most preferably of 5 wt. % or less based on the total weight of the reaction mixture.

Preferably the polyunsaturated compound is present in the reaction mixture fed to the reaction zone in a concentration of at least 0.01 wt. %, more preferably of at least 0.03 wt. %, even more preferably of at least 0.06 wt. % based on the total weight of the reaction mixture.

The polyunsaturated compound is preferably present in the reaction mixture fed to the reaction zone in a concentration of 5.0 wt. % or less, more preferably of 3.0 wt. % or less and most preferably of 2.0 wt. % or less based on the total weight of the reaction mixture.

Usually ethylene is present in the reaction mixture fed to the reaction zone in a concentration of 85 wt. % or more.

In case the polyunsaturated grade used as the polyunsaturated compound contains impurities, e.g. by-products from the manufacturing process which have not been separated, the above concentration ranges for the polyunsaturated compound refer to the grade including the impurities. Such impurities are usually caused by the manufacturing process. Normally the content of impurities is <20 wt. % based on the grade of the polyunsaturated compound.

The inhibitor is preferably present in the reaction mixture fed to the reaction zone in an amount of at least 0.00005 wt. %, more preferably in an amount of at least 0.00010 wt. % and most preferably in an amount of at least 0.00025 wt. % based on the total weight of the reaction mixture.

Preferably, the inhibitor is present in the reaction mixture fed to the reaction zone in an amount of 0.020 wt. % or less, more preferably in an amount of 0.010 wt. % or less and most preferably in an amount of 0.005 wt. % or less based on the total weight of the reaction mixture.

The inhibitor is preferably present in the reaction mixture fed to the reaction zone in an amount of at least 0.025 wt. %, more preferably in an amount of at least 0.050 wt. % and most preferably in an amount of at least 0.10 wt. % based on the total weight of the polyunsaturated olefin and the inhibitor in the reaction mixture.

Preferably, the inhibitor is present in the reaction mixture fed to the reaction zone in an amount of 1.0 wt. % or less, more preferably in an amount of 0.8 wt. % or less and most preferably in an amount of 0.6 wt. % or less based on the total weight of the polyunsaturated olefin and the inhibitor in the reaction mixture.

The inhibitor is preferably selected from phenolic-group containing compounds, amino group-containing compounds or mixtures thereof, more preferably two or less different inhibitors are used and most preferably either a phenolic-group containing compound or an amino group-containing compound is used as inhibitor.

Preferably, the phenolic-group containing compound comprises the structural element (I):

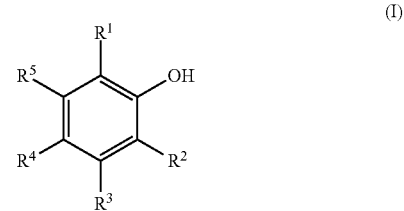

(I)

wherein
$R^1$ to $R^5$ independently are
H,
hydrocarbyl, optionally containing heteroatoms, or
OH
with the proviso that at least two of $R^1$ to $R^5$ independently are hydrocarbyl, optionally containing heteroatoms, or OH, whereby two or more of $R^1$ to $R^5$ maybe connected with each other more preferably, at least one of $R^1$ to $R^5$ is a hydrocarbyl, optionally containing heteroatoms, with more than 3 carbon atoms or at least two of $R^1$ to $R^5$ are connected with each other
whereby, in case $R^1$, $R^2$ or $R^4$ are OH, the structural element (I) may also be present in quinone form, thus, the OH-group of the structural element (I) and $R^1$, $R^2$ or $R^4$ being an OH-group are present as keto-groups.

Usually in case one or more of $R^1$ to $R^5$ are hydrocarbyls, optionally containing heteroatoms, each of $R^1$ to $R^5$ does not contain more than 30 carbon atoms.

In case heteroatoms are present in $R^1$ to $R^5$ these heteroatoms are preferably selected from N, P, S and O, more preferably oxygen is the only heteroatom present in $R^1$ to $R^5$, even more preferably, if present, oxygen is only present in $R^1$ to $R^5$ as keto-group, OH— group, ether group or ester group.

Suitable phenolic-group containing compounds are DTBHQ (2,5-Di-tert. butyl hydroquinone, CAS-no. 88-58-4), Sumilizer GS (2(1-(2-Hydroxy-3,5-di-t-pentylphenyl) ethyl)-4,6-di-t-pentylphenyl acryl, CAS-no. 123968-93-7), Vitamin E (CAS 10191-41-0), DTAHQ (2,5-Di(tert-amyl) hydroquinone, CAS 79-74-3), BHT (2,6-di-tert. butyl-4-methyl phenol, CAS 128-37-0) and TBC (tert-butyl catechol CAS 98-29-3) whereof Vitamin E (CAS 10191-41-0), DTAHQ (2,5-Di(tert-amyl)hydroquinone, CAS 79-74-3), BHT (2,6-di-tert. butyl-4-methyl phenol, CAS 128-37-0) and TBC (tert-butyl catechol CAS 98-29-3) are especially preferred.

Preferably, the amino group in the amino group-containing compound is a secondary amino group, more preferably, the amino group-containing compounds comprises the structural element (II):

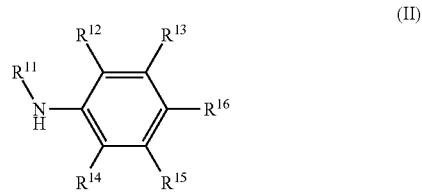

(II)

wherein
$R^{12}$ to $R^{16}$ independently are H or hydrocarbyl, optionally containing heteroatoms, whereby two or more of $R^{12}$ to $R^{16}$ maybe connected with each other, preferably $R^{12}$ to $R^{15}$ independently are H or hydrocarbyl and $R^{16}$ is hydrocarbyl whereby $R^{16}$ maybe connected with $R^{13}$ or $R^{15}$ in case at least one thereof is/are hydrocarbyl, more preferably $R^{12}$ to $R^{15}$ are H and $R^{16}$ is hydrocarbyl.

$R^{11}$ is a hydrocarbyl group, optionally containing heteroatoms, preferably $R^{11}$ contains 6 to 30 carbon atoms or less.

$R^{11}$ is preferably free of heteroatoms. However, in case heteroatoms are present in $R^{11}$, they are preferably present as —N(H)— or —N(H)—S((O)$_2$)— groups (more preferably —N(H)— groups), more preferably $R^{11}$ is a $C_6$ to $C_{30}$ hydrocarbyl, even more preferably $R^{11}$ is a $C_6$ to $C_{20}$ hydrocarbyl.

Usually in case one or more of $R^{12}$ to $R^{16}$ are hydrocarbyls, each of $R^{12}$ to $R^{16}$ does not contain more than 30 carbon atoms, preferably not more than 20 carbon atoms.

Suitable amino-group containing compounds are Tinuvin 770 (Bis-(2,2,6,6-tetramethyl-4-piperidyl)-sebacate, CAS-no. 52829-07-9), Naugard 445 (4,4'-bis(1,1'-dimethylbenzyl) diphenylamine, CAS-no. 10081-67-1), Naugard SA (p-(p-toluene-sulfonylamido)-diphenylamine, CAS-no. 100-93-6), Naugard J (N,N'-diphenyl-p-phenylene-diamine, CAS-no. 74-31-7), AgeRite White (N, N'-dinaphtyl-p-phenylene-diamine, CAS-no. 93-46-9) and Vanox 12 (p,p'-dioctyldiphenylamine, CAS-no. 101-67-7) whereof Naugard 445 (4,4'-bis(1,1'-dimethylbenzyl)diphenylamine, CAS-no. 10081-67-1) is especially preferred.

The inhibitor is preferably soluble in the polyunsaturated olefin at 23° C.

As already stated above, the inhibitor is added to the reaction mixture or any of its components. Thus, the inhibitor may, for example, be added to the mixture of ethylene and polyunsaturated olefin. Alternatively, the inhibitor may be combined, e.g. mixed, with the polyunsaturated olefin, optionally together with further components, such as a solvent, and the obtained mixture added to the ethylene. The inhibitor may also be mixed with the additional comonomer(s) described further below.

Thus, the inhibitor is present in the reaction mixture before a radical initiator is added to the reaction mixture.

In case more than one reaction zone is present, the inhibitor is usually added to the reaction mixture or any of its components before the reaction mixture is fed to the first reaction zone.

The inhibitor is preferably added to the reaction mixture together with the polyunsaturated comonomer. Hence, the inhibitor is preferably mixed with is the polyunsaturated comonomer or a solution containing inhibitor and polyunsaturated comonomer is prepared and added to the reaction mixture before the reaction mixture is fed to the reaction zone. Usually, the reaction zone(s) are located in a reactor. Thus, the inhibitor is usually added to the reaction mixture or any of its components before the reaction mixture is fed to the reactor.

Preferably, the inhibitor is added to the pre-heater, if present, more preferably, the inhibitor is added together with the polyunsaturated comonomer to the pre-heater, if present and most preferably the inhibitor is already present in the reaction mixture before the reaction mixture is fed to the pre-heater.

To determine whether a reaction mixture is likely to cause fouling, the reaction mixture without the radical initiator is subjected to conditions as present in a pre-heater and the grade of conversion (i.e. polymerisation/oligomerisation) is determined. As the whole mixture is tested it can be reliably determined which grade of conversion occurs under which conditions and, thus, the suitability of the inhibitor can be tested with a few simple experiments. This method is denoted "zero conversion test" and described in detail in the experimental part.

Preferably the inhibitor reduces the percentage of conversion by a factor of at least 0.9, more preferably by a factor of at least 0.8 and most preferably by a factor of at least 0.7 in the zero conversion test.

In the present invention the zero conversion test is carried out at 200 MPa and at 230° C.

Unwanted radicals originating from impurities of the polyunsaturated olefin grade are believed to be predominantly responsible for fouling. Usually such radicals form upon thermal decomposition.

The decomposition temperature of a compound or mixture of compounds can be determined by differential scanning calometry (DSC). In the present invention decomposition temperature denotes the temperature at which the exothermal reaction reaches its maximum according to the DSC thermogram. The type of impurities affect the shape of this peak and thus the actual decomposition may start at a lower temperature.

However, the impurities may have a lower decomposition temperature and, thus, may form radicals which, in turn, cause fouling. It has been found that polyunsaturated olefin grades having a decomposition temperature as measured by DSC of at least 140° C. are particular advantageous in the process according to the present invention. However, by using an inhibitor the decomposition temperature can be further improved.

The inhibitor preferably increases the decomposition temperature of the polyunsaturated olefin by at least 5° C., more preferably at least 15° C. and most preferably at least 30° C. according to DSC.

In case a pre-heater is present, the foregoing contents of polyunsaturated olefin preferably refer to the content when exiting the pre-heater. In case no pre-heater is present, the foregoing contents of polyunsaturated olefin and ethylene preferably refer to the content of the reaction mixture at the moment the radical initiator is added but the reaction has not started.

In case more than one reaction zone is present the term "reaction zone" refers to the first reaction zone where radical initiator is added. Usually, the reaction zone(s) are located in a reactor.

In case a pre-heater is used, preferably the reaction mixture is heated to a temperature of 100° C. or higher, more preferably 120° C. or higher and most preferably 140° C. or higher before entering the reaction zone. Usually the reaction mixture is pre-heated to a temperature of 200° C. or less. The pressure in the pre-heater is similar to that in the reaction zone where the reaction mixture is fed to. In this respect "similar" denotes that the pressure in the pre-heater is ±10% of the pressure in the reaction zone where the reaction mixture is fed to. Usually the reaction zone where the reaction mixture is fed to is located in a reactor such as an autoclave or tubular reactor.

The polymerisation may be implemented in the presence of one or more other comonomers which can be copolymerised with the two monomers. Such olefinically, advantageously vinylically, unsaturated comonomers is include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl (meth)-acrylate, ethyl(meth)acrylate and butyl(meth)acrylate, (d) olefinically unsaturated carboxylic acids, such as (meth)acrylic acid, maleic acid and fumaric acid, (e) (meth) acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-methyl styrene.

The polymerisation with other comonomers besides the polyunsaturated olefin is applied in particular when it is desired to make a cross-linkable polymer composition less crystalline, more polar, or both. In that case the comonomer (or termonomer) should include at least one polar group, such as a siloxane, a silane, an amide, an anhydride, a carboxylic, a carbonyl, an acyl, a hydroxyl or an ester group.

Examples of such comonomers include group (a), (c), (d), (e), and (f) mentioned above.

Amongst these comonomers, vinyl esters of monocarboxylic acids having 1-4 carbon atoms, such as vinyl acetate, and (meth)acrylate of alcohols having 1-4 carbon atoms, such as methyl(meth)acrylate, are preferred. Especially preferred comonomers are butyl acrylate, ethyl acrylate and methyl acrylate. Two or more such olefinically unsaturated compounds may be used in combination. As used herein, the term "(meth)acrylic acid" is meant to encompass acrylic acid as well as methacrylic acid.

The present invention is further directed to the use of an inhibitor to reduce fouling in an ethylene homo- or copolymerization process.

Preferably, the process is a high-pressure radical ethylene polymerization process wherein ethylene is polymerized with a polyunsaturated olefin to comprising at least 6 carbon atoms and at least two non-conjugated double bonds of which at least one is terminal.

Further, preferably, the inhibitor is used to reduce pre-heater fouling.

The present invention is furthermore directed to an ethylene homo- or copolymer obtainable in the process according to all of the above is described embodiments of the invention.

The present invention is furthermore directed to a composition obtainable by cross-linking of the ethylene homo- or copolymer obtainable in the process according to all of the above described embodiments of the invention.

The present invention is also directed to a cable comprising the ethylene homo- or copolymer polymer and/or the composition according to the invention.

The present invention will be further illustrated by the examples described below.

METHODS AND EXAMPLES

Zero Conversion Test

A set-up consisting of a multi-stage compressor, a continuously stirred tank reactor (CSTR) and a fine valve to control the pressure is used. The inner volume of the reactor is approximately 50 ml as described in Buback, M.; Busch, M.; Lovis, K.; Mahling, F-O.; Chemie lngenieur Technik (67) no. 12 p. 1652-1655; and
Buback, M.; Busch, M.; Lovis, K.; Mahling, F-O. Chem.-Ing.-Tech. 66 (1994) no. 4, p 510-513.

The content of both documents is herewith incorporated by reference.

Electrical heating coils allows for heating of the reactor walls to a desired temperature prior to each experiment and hence conditions similar to a pre-heater in a plant can be obtained. No free radical initiator, e.g. peroxide, oxygen etc. is added. Conversion is calculated as the average weight of polymer formed per time unit divided by the feed rates of the reactants.

The reactor is preheated to a temperature of 230° C. A flow of 1000 g ethylene and 2.5 g propionaldehyde per hour is injected into the reactor is until stable conditions are reached at a pressure of 200 MPa and an average reactor temperature of ~225° C. A flow of 4 g/h of polyunsaturated olefin (e.g. 1,7-octadiene) and 4 g/h heptane (solvent) is then introduced into the reactor. Depending on the reactivity, the temperature in the reactor may increase. Conversion is calculated after obtaining steady state conditions in the reactor. In the present invention steady state conditions are obtained in case the temperature did not change more than +/−1.0° C. over a period of 10 min.

It was found that when feeding only ethylene (99.75%) and propionaldehyde (0.25%) a zero conversion of typically ~0.5-1% was obtained. The heptane also exhibited a zero conversion in the same range. Here the total zero conversion is provided.

Differential Scanning Calorimetry (DSC)

The decomposition temperature was measured with Mettler TA820 differential scanning calorimeter. The sample of 1,7-octadiene was put in a pressure resistant sealable container. The measurement was started at a temperature of 40° C. and then increased (ramped) by 5° C./min until a temperature of 200° C. was reached. The heat flow (W/g) was measured during the temperature ramping.

The decomposition temperature is defined as the temperature at which the exothermal reaction reaches its peak value defined as heat flow.

Gas Purity is Provided Defined as wt. %.

The purity was deterimed with a Varian 450 gas chromatograph having an FID with Galaxie CDS and colon VF-1ms, 60 m×0.32 mm×1.0 μm. 1 μl is injected and the GC % area of polyunsaturated compound (e.g. 1,7-octadiene) is calculated as purity.

Injector Temperature: 150°.

Temperature profile: 60° C. for 10 min; 10° C. increase per min up to 250° C.; 250° for 2 min=31 minutes total, He flow 1.0 ml/min.

Detector temperature: 250° C.

Detector range: X 11

Make up flow 29 ml/min

Hydrogen flow 30 ml/min

Air flow 300 ml/min

EXAMPLES

Zero Conversion Tests

Reaction mixtures having the compositions as provided in table 1 are subjected to the zero conversion test as described above. The results are shown in FIG. 1

TABLE 1

| (all amounts are given in wt. %) | | | | | | |
|---|---|---|---|---|---|---|
| | RE1 | RE2 | IE3 | IE4 | IE5 | IE6 |
| ethylene | 98.95 | 98.95 | 98.9484 | 98.9495 | 98.9491 | 98.9492 |
| propionaldehyde | 0.25 | 0.25 | 0.25 | 0.25 | 0.25 | 0.25 |
| 1,7-octadiene[1] | 0.4 | 0.4 | 0.4 | 0.4 | 0.4 | 0.4 |
| Heptane | 0.4 | 0.4 | 0.4 | 0.4 | 0.4 | 0.4 |
| Vitamin E[2] | | | 0.0016 | | | |
| DTAHQ[3] | | | | | 0.0009 | |

TABLE 1-continued (all amounts are given in wt. %)

|  | RE1 | RE2 | IE3 | IE4 | IE5 | IE6 |
|---|---|---|---|---|---|---|
| BHT[4)] |  |  |  |  |  | 0.0008 |
| TBC[5)] |  |  |  | 0.0005 |  |  |
| Zero conversion | 7.6% | 7.0% | 6.6% | 4.6% | 5.1% | 5.9% |

RE = reference example;
IE = inventive example
[1)] obtained from Kuraray and having a purity of 97%
[2)] CAS 10191-41-0, Mw = 430.7 g/mol
[3)] 2,5-Di(tert-amyl)hydroquinone, CAS 79-74-3, Mw 250.4 g/mol
[4)] 2,6-di-tert. butyl-4-methyl phenol, CAS 128-37-0, Mw 220.4 g/mol
[5)] tert-butyl catechol CAS 98-29-3, Mw = 166.2 g/mol DSC Data on Stabilised Octadiene In reference example 7 (RE7) 1,7-octadiene (97%) as obtained from Kuraray has been tested. In Inventive examples 8 to 14 (IE8 to IE14) the 1,7-octadiene (97%) as obtained from Kuraray was mixed with the respective inhibitor such that a solution containing 0.1 mol % inhibitor in 1,7-octadiene has been obtained. In inventive example 16 (IE15) said 1,7-octadiene has been mixed with butyl acrylate at a weight ratio of 1:1.

TABLE 2

|  | Inhibitor | DSC peak [° C.] |
|---|---|---|
| RE7 | None | 141.5 |
| IE8 | BHT (2,6-di-tert. butyl-4-methyl phenol, CAS 128-37-0) | 178.2 |
| IE9 | DTAHQ (2,5-Di(tert-amyl)hydroquinone, CAS 79-74-3) | 156.0 |
| IE10 | Vitamin E (CAS 10191-41-0) | 186.0 |
| IE11 | TBC (tert-butyl catechol CAS 98-29-3) | 185.0 |
| IE12 | Tinuvin 770 (Bis-(2,2,6,6-tetramethyl-4-piperidyl)-sebacate, CAS-no. 52829-07-9) | 156.2 |
| IE13 | Naugaard 445 (4,4'-bis(1,1'-dimethylbenzyl)-diphenylamine, CAS-no. 10081-67-1) | 188.8 |
| IE14 | Sumilizer GS 2(1-(2-Hydroxy-3,5-di-t-pentylphenyl) ethyl)-4,6-di-t-pentylphenyl acryl, CAS-no. 123968-93-7) | 164.9 |
| IE15 | Butyl acrylate | 157.5 |

In reference example 16 (RE16) 1,7-octadiene (97%) as obtained from Evonik has been tested. In Inventive examples 17 to 23 (IE17 to IE23) the 1,7-octadiene (97%) as obtained from Evonik was mixed with the respective inhibitor such that a solution containing 0.1 mol % inhibitor in 1,7-octadiene has been obtained. In inventive example 24 (IE24) said 1,7-octadiene has been mixed with butyl acrylate at a weight ratio of 1:1.

TABLE 3

|  | Inhibitor | DSC peak [° C.] |
|---|---|---|
| RE16 | None | 140.9 |
| IE17 | BHT (2,6-di-tert. butyl-4-methyl phenol, CAS 128-37-0) | 170.6 |
| IE18 | DTAHQ (2,5-Di(tert-amyl)hydroquinone, CAS 79-74-3) | 155.7 |
| IE19 | Vitamin E (CAS 10191-41-0) | 160.4 |
| IE20 | TBC (tert-butyl catechol CAS 98-29-3) | 157.3 |
| IE21 | Tinuvin 770 (Bis-(2,2,6,6-tetramethyl-4-piperidyl)-sebacate, CAS-no. 52829-07-9) | 147.4 |

TABLE 3-continued

|  | Inhibitor | DSC peak [° C.] |
|---|---|---|
| IE22 | Naugaard 445 (4,4'-bis(1,1'-dimethylbenzyl)-diphenylamine, CAS-no. 10081-67-1) | 175.8 |
| IE23 | Sumilizer GS 2(1-(2-Hydroxy-3,5-di-t-pentylphenyl) ethyl)-4,6-di-t-pentylphenyl acryl, CAS-no. 123968-93-7) | 158 |
| IE24 | Butyl acrylate | 158.6 |

A higher decomposition temperature denotes that fouling will start at a higher temperature, hence allowing a higher preheater temperature. This means that a higher reactor inlet temperature is achieved which is important for initiating polymerisation efficiently in zone 1 of the reactor.

The invention claimed is:

1. An ethylene homo- or copolymerization process, wherein an inhibitor is added to the reaction mixture or any of its components before the reaction mixture is fed to the reaction zone.

2. The process according to claim 1 which is a high pressure ethylene polymerization process in which ethylene is polymerized with a polyunsaturated olefin comprising at least 6 carbon atoms and at least two non-conjugated double bonds of which at least one is terminal.

3. Process according to claim 2, wherein the high pressure radical ethylene polymerization reaction is performed in a tubular reactor.

4. Process according to claim 2, wherein the polyunsaturated olefin is a C6 to C20-olefin.

5. Process according to claim 2, wherein the polyunsaturated olefin is present in the reaction mixture fed to the reaction zone in a concentration of from 0.01 to 10 wt. % based on the total weight of the reaction mixture.

6. Process according to claim 2, wherein the inhibitor is present in the reaction mixture fed to the reaction zone in an amount of 0.01 to 5 wt. % based on the total weight of the polyunsaturated olefin and the inhibitor in the reaction mixture.

7. Process according to claim 2, wherein the inhibitor increases the decomposition temperature of the polyunsaturated olefin by at least 5° C. according to DSC.

8. Process according to claim 1, wherein the inhibitor is selected from phenolic-group containing compounds, amino group-containing compounds or mixtures thereof.

9. Process according to claim 2, wherein the inhibitor is selected from phenolic-group containing compounds, amino group-containing compounds or mixtures thereof.

10. Process according to claim 8, wherein the phenolic-group containing compound comprises the structural element (I):

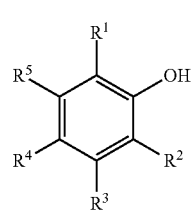

(I)

wherein R1 to R5 independently are H, hydrocarbyl, optionally containing heteroatoms, or OH with the proviso that at least two of R1 to R5 independently are hydrocarbyl or OH.

11. Process according to claim 8, wherein the amino group in the amino group-containing compound is a secondary amino group.

12. Process according to claim 8, wherein the amine group-containing compounds comprises the structural element (II):

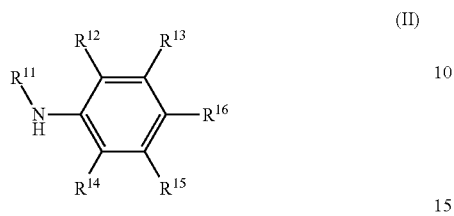

(II)

wherein
R12 to R16 independently are H or hydrocarbyl, optionally containing heteroatoms, whereby two or more of R12 to R16 maybe connected with each other
R11 is a hydrocarbyl group, optionally containing heteroatoms.

13. Process according to claim 1, wherein the reaction mixture comprises a chain transfer agent.

14. Process according to claim 2, wherein the reaction mixture comprises a chain transfer agent.

15. Method to reduce fouling in an ethylene homo- or copolymerization process comprising adding an inhibitor to the reaction mixture or any of its components before the reaction mixture is fed to the reaction zone.

\* \* \* \* \*